Aug. 25, 1942.   C. L. EKSERGIAN   2,293,975
TRUCK AND BRAKE ASSEMBLY
Filed March 1, 1940   2 Sheets-Sheet 1

INVENTOR
Carolus L. Eksergian
BY John P. Barbey
ATTORNEY

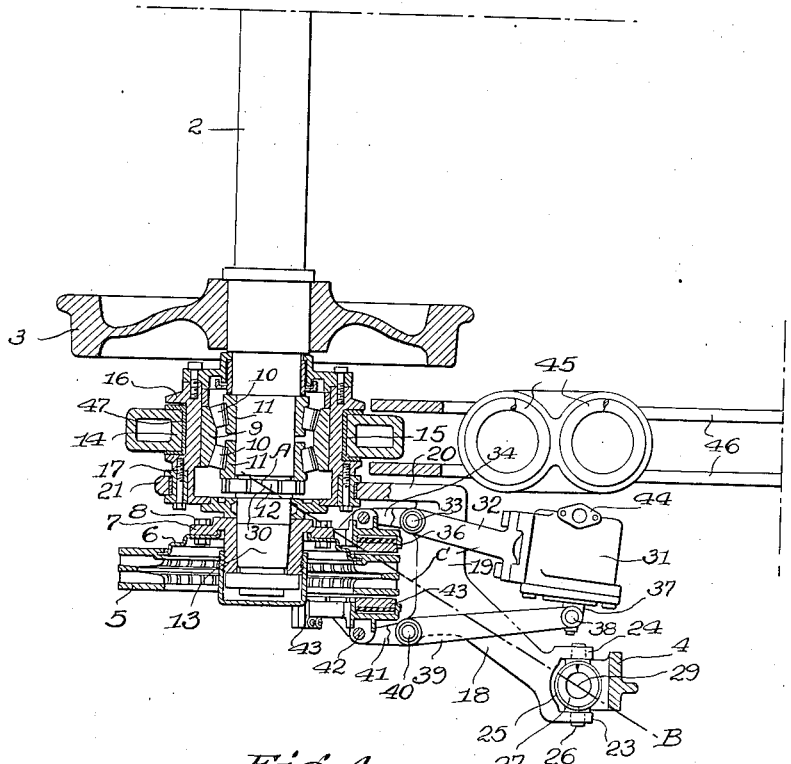

Patented Aug. 25, 1942

2,293,975

UNITED STATES PATENT OFFICE 2,293,975

TRUCK AND BRAKE ASSEMBLY

Carolus L. Eksergian, Detroit, Mich., assignor to Budd Wheel Company, Philadelphia, Pa., a corporation of Pennsylvania Application March 1, 1940, Serial No. 321,687

4 Claims. (Cl. 188—59)

The present invention relates to brakes.

More particularly, it relates to brakes of the so-called disk type wherein the brake comprises a ring secured to the rotating member which is to be braked, an wherein brake shoes are forced against the side faces of the ring to provide the braking effort.

A specific object of the present invention is to provide a brake mechanism of this type in a readily accessible position by securing the brake ring to an extension of a car axle, and locating the brake shoes and their operating mechanism outside the side frames of the wheel truck, whereby the entire brake mechanism may be removed and/or replaced without taking the axles out of the wheel trucks, and whereby minor repairs may be made readily without removing such mechanism at all.

In the present invention, certain desirable features of operation are secured by mounting the brake mechanism in such a way that the resultant point of action of the braking force is substantially colinear with two points of support of the brake shoe supporting mechanism from the truck, disposed on opposite sides of the brake ring in such way as to eliminate any tendency of twisting of said shoes or support, which might result in improper action or binding of the brakes, and in order to provide one of said points of support, the invention contemplates forming an extension projecting outwardly from each side frame of the truck to house the same.

Other objects and advantages of the invention will be clear from the present specification, description of a preferred form of the invention, and the drawings accompanying the same and more or less diagrammatically illustrating it.

In said drawings:

Fig. 3 is a fragmentary sectional plan view of the structure, the section being made on the plane indicated by the line 3—3 of Fig. 2; and Fig. 4 is a corresponding sectional elevation, on the planes indicated by the broken line 4—4 of Fig. 1.

In all the figures, corresponding elements are indicated by similar reference characters.

Figure 1:
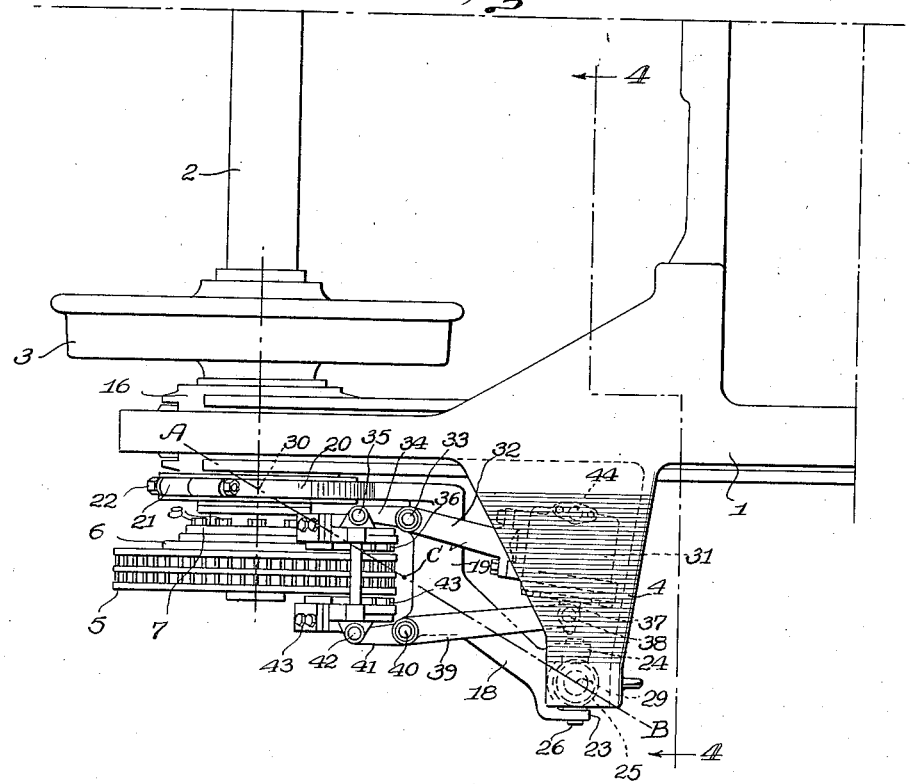
Fig. 1 is a fragmentary plan view showing a corner of a truck frame with the brake mechanism applied to the end of one of the wheel axles.

In the drawings, 1 indicates the frame of a wheel truck having an axle 2 carrying a wheel 3. Extending outwardly from a side frame of the wheel truck there is provided a bracket 4, serving for mounting and protecting certain parts of the brake mechanism. The axle 2 may have a portion 13 of reduced diameter extending outwardly therefrom, and on this end portion may be mounted a flanged hub 7, carrying a flange 6 secured thereto by bolts 8, the brake ring 5 being in turn carried by the flange 6.

The equalizer bars 46 rest in the usual manner upon the journal box and also support the frame 1 carrying the pedestals 14 and 15 between which said journal box slides by means of the springs 45 interposed between members 46 and 1. The pedestals 14 and 15 support the journal box 16, within which the end of the axle 2 is mounted for rotation, in the present case by means of tapered-roller bearings, comprising the outer race 9, the inner races 11 and the rolls 10 disposed between said inner and outer races. A retainer 12 may be secured to the axle in any desired way, to hold the inner races 10 in proper position.

Figure 2:
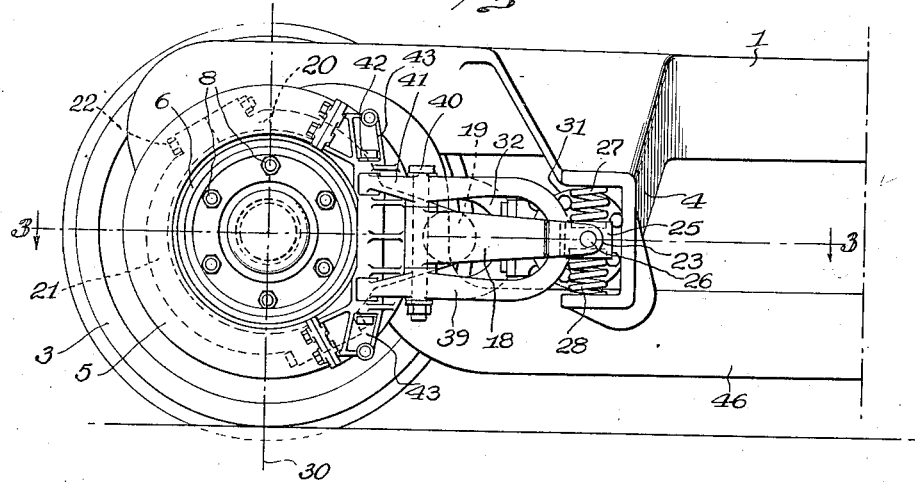
Fig. 2 is a side elevation corresponding to Fig. 1.

The journal box 16 may have a circumferential groove 17 formed therein at its outer end, to cooperate with a part of the brake support, namely, the arm 20 extending forward from the brake supporting frame 19, said arm 20 terminating in a semi-circular yoke engaged in the groove 17 and held in place by a semi-circular strap or companion yoke 21, attached thereto by bolts 22 as shown in Figs. 1 and 2. This thus provides a pivotal mounting for the brake frame 19, so that said frame and the mechanism carried thereby may turn freely about the axis of the axle 2.

In order to restrain said pivotal motion within small limits, a rearwardly extending arm 18 is formed on the frame 19, said arm 18 preferably being bifurcated or forked at its end as shown at 23 and 24, a block 25 pivotally mounted between the arms 23 and 24, by means of a pin 26, and springs 27 and 28 being received in depressions in the upper and lower faces of said block 25, to provide a resilient mounting for the ends of said arm 18 within the housing formed by the bracket 4.

It will be noted that the center point 29 of said block 25, and the vertical line 30 passing through the axis of the axle 2, define a vertical plane (as shown by the line A—B of Fig. 1) which passes through the brake ring 5 and substantially through the vertical lines through point C midway between pivots 33 and 40 which is substantially coincident with the direction of the resultant tangential drag of the shoes, and the significance of this feature will be explained more fully hereinafter.

The brake applying mechanism may comprise a fluid pressure cylinder 31, bolted or otherwise secured to a forked brake lever 32, pivotally mounted at 33 on the frame 19, said lever 32 having short arms 34 on the other side of said pivot, pivotally connected at 35 to a brake shoe 36. The cylinder 31 contains the customary piston, whose piston rod 37 is pivotally connected at 38 to the long arm of a companion forked lever 39, pivotally mounted at 40 on the brake frame 19, the short arms 41 of lever 39 being pivotally connected at 42 to a companion brake shoe 43, said brake shoes 36 and 43 being located on opposite sides of the brake ring 5, so that when pressure-fluid is supplied to the cylinder 31 through the port 44, the effect will be to force the two brake shoes against the opposite side faces of the brake ring 5 to provide the braking effort. It will be noted that the entire brake shoe applying mechanism "floats" by reason of the pivots 33 and 40, so that the braking pressures will be automatically equalized.

When the brake shoes are applied against the faces of the ring 5, said ring will tend to carry the brake frame around with it in one direction or the other, depending upon the direction of rotation of the wheel 3, and such rotation of the frame 19 will be prevented by one or the other of the springs 27 and 28 bearing against the block 25, the springs becoming respectively compressed and extended sufficiently to overcome the resultant force, the said springs thus preventing sudden shocks when the braking force is applied.

The operation of the invention will be obvious from the structure, and may be summarized briefly as follows:

When compressed air or the like is admitted to the brake cylinder 31, the brake shoes 36 and 43 will be forced with equal pressures against the opposite faces of the ring 5, and as stated will produce the necessary braking force, whose resultant, whether up or down, will act in a vertical direction substantially in line with a vertical line through C or the direction of resultant tangential drag indicated in Figs. 1 and 3 at the midpoint of a line joining the pivotal supports 33, 40 of the shoes. This vertical line as clearly appears, is also approximately tangential to the periphery of the disc 5. As has been pointed out, the vertical plane A—B of Fig. 1 contains the vertical line 30 intersecting the axis of the axle 2 on the one hand, and contains also the point 29 on the other hand, located approximately in the center of the block 25. By reason of this construction, the resultants of the braking efforts due respectively to the shoe 36 and to the shoe 43, will act on opposite sides of C, and will tend to turn the entire brake yoke 19 in opposite senses about C, thus substantially neutralizing one another's turning moments and yielding a truly vertical resultant braking effort acting substantially at the point C, which is substantially colinear with the points of support 29, 30 of the brake shoe supporting frame from the truck.

This eliminates any tendency of the brake frame or yoke to twist about a horizontal axis, and thus no twisting or binding action occurs between the bearing portion of the arm 20 and strap 21, and the walls of the groove 17 in the end of the journal box, whereon said parts are pivoted. The brake mechanism therefore operates more smoothly, has no tendency to bind, and is much freer from derangement in service. Owing to the ready accessibility of the entire mechanism, such derangements as do occur may be repaired readily.

While the invention has been disclosed herein by reference to a specific embodiment thereof, at present believed to be a preferred form, it should be clearly understood that such illustration is more or less arbitrary and is highly diagrammatic. Certain details may be added or others modified and still others may be removed entirely, without departing from the invention, which is defined solely by the following claims.

What is claimed is:

1. A wheel truck having a frame, a journal box carried thereby, an axle journaled in said box and projecting outward beyond the same, a brake ring mounted on said projecting part of the axle, a brake shoe, means for forcing said brake shoe against the ring, a brake frame carrying said means and mounted to pivot about the axis of the axle, and an abutment cooperating with said brake frame to restrict the pivotal movement thereof, the relative locations of the elements being such that the vertical lines passing through the brake frame at the pivot and at the abutment respectively define a vertical plane passing substantially through the resultant point of action of the braking effort on said brake frame.

2. A wheel truck frame having an axle mounted therein, a brake ring carried by said axle and located outside the frame, a brake yoke mounted outside the frame, said yoke carrying a brake shoe and means for forcing the same against the brake ring, said yoke being supported about two points so located that the straight line connecting them will pass substantially through the resultant point of action of the braking effort on said brake yoke.

3. A wheel truck having an axle mounted therein, said axle projecting beyond the outside of the truck, a brake ring carried by said projecting part of the axle, a brake yoke pivotally mounted about the axis of the axle at a point closely adjacent the outside of the truck, and means extending outward from the outside of the truck, said yoke being yieldably supported by said means, said yoke carrying brake shoes and means for forcing them against the side of the ring, the yoke being supported at two points opposite one another with respect to the resultant vertical central point of action of the braking effort of the said shoes on said brake yoke.

4. A wheeled truck having a frame, a wheel and axle assembly supporting said frame, a rotary brake element mounted to rotate with said wheel and axle assembly outside said frame, a non-rotary brake element in cooperative relation to said rotary element, a support for said non-rotary element carried at its opposite ends at points on said wheel and axle assembly and frame, respectively, the line joining said points passing substantially through the resultant point of action of the braking effort on said support.

CAROLUS L. EKSERGIAN.